United States Patent
Wiencke et al.

(10) Patent No.: US 10,437,596 B2
(45) Date of Patent: Oct. 8, 2019

(54) PROCESSOR WITH A FULL INSTRUCTION SET DECODER AND A PARTIAL INSTRUCTION SET DECODER

(71) Applicant: TEXAS INSTRUMENTS INCORPORATED, Dallas, TX (US)

(72) Inventors: Christian Wiencke, Garching (DE); Shrey Bhatia, Freising (DE)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 174 days.

(21) Appl. No.: 14/554,709

(22) Filed: Nov. 26, 2014

(65) Prior Publication Data
US 2016/0147538 A1   May 26, 2016

(51) Int. Cl.
G06F 9/38    (2018.01)
G06F 9/30    (2018.01)

(52) U.S. Cl.
CPC ........ G06F 9/30196 (2013.01); G06F 9/3822 (2013.01); G06F 9/3836 (2013.01)

(58) Field of Classification Search
CPC .................................................. G06F 9/3822
See application file for complete search history.

(56) References Cited

U.S. PATENT DOCUMENTS

| | | | |
|---|---|---|---|
| 5,283,874 A * | 2/1994 | Hammond | G06F 9/3836 711/214 |
| 5,416,913 A * | 5/1995 | Grochowski | G06F 9/30145 712/216 |
| 5,574,937 A * | 11/1996 | Narain | G06F 11/3636 712/200 |
| 5,630,083 A * | 5/1997 | Carbine | G06F 9/30145 712/211 |
| 5,692,167 A * | 11/1997 | Grochowski | G06F 9/30192 711/209 |
| 5,787,026 A * | 7/1998 | Orenstein | G06F 9/3867 708/521 |
| 5,881,279 A * | 3/1999 | Lin | G06F 9/268 712/209 |

(Continued)

OTHER PUBLICATIONS

Intel "Pentiumtm Processor At iCOMP Index 510T60 MHz" Nov. 1994, Order No. 241595-002.*

(Continued)

Primary Examiner — Jacob Petranek
(74) Attorney, Agent, or Firm — Kenneth Liu; Charles A. Brill; Frank D. Cimino (57) ABSTRACT

An apparatus and method system and method for increasing performance in a processor or other instruction execution device while minimizing energy consumption. A processor includes a first execution pipeline and a second execution pipeline. The first execution pipeline includes a first decode unit and a first execution control unit coupled to the first decode unit. The first execution control unit is configured to control execution of all instructions executable by the processor. The second execution pipeline includes a second decode unit, and a second execution control unit coupled to the second decode unit. The second execution control unit is configured to control execution of a subset of the instructions executable via the first execution control unit.

18 Claims, 4 Drawing Sheets

(56) References Cited

U.S. PATENT DOCUMENTS

| | | | | |
|---|---|---|---|---|
| 7,958,335 B2* | 6/2011 | Blasco Allue | ...... | G06F 9/30145 |
| | | | | 712/209 |
| 2004/0172519 A1* | 9/2004 | Nakajima | ........... | G06F 9/30076 |
| | | | | 712/209 |
| 2004/0205322 A1* | 10/2004 | Shelor | ................. | G06F 9/30145 |
| | | | | 712/209 |
| 2012/0089818 A1* | 4/2012 | Craske | ................ | G06F 9/30145 |
| | | | | 712/209 |

OTHER PUBLICATIONS

David A. Patterson, John L. Hennessy. "Computer Organization and Design: The Hardware/Software Interface 2nd Edition" Morgan Kaufmann; Aug. 15, 1997, pp. 151-152.*

* cited by examiner

PROCESSOR WITH A FULL INSTRUCTION SET DECODER AND A PARTIAL INSTRUCTION SET DECODER

BACKGROUND

Processors and other instruction execution machines apply various techniques to increase performance. Pipelining is one technique employed to increase the performance of processing systems such as microprocessors. Pipelining divides the execution of an instruction (or operation) into a number of stages where each stage corresponds to one step in the execution of the instruction. As each stage completes processing of a given instruction, and processing of the given instruction passes to a subsequent stage, the stage becomes available to commence processing of the next instruction. Thus, pipelining increases the overall rate at which instructions can be executed by partitioning execution into a plurality steps that allow a new instruction to begin execution before execution of a previous instruction is complete. A processor that includes a single instruction pipeline can execute instructions at a rate approaching one instruction per cycle.

SUMMARY

An apparatus and method for increasing performance in a processor, or other instruction execution device, while minimizing energy consumption are disclosed herein. In one embodiment, a processor includes a first execution pipeline and a second execution pipeline. The first execution pipeline includes a first decode unit and a first execution control unit coupled to the first decode unit. The first execution control unit is configured to control execution of all instructions executable by the processor. The second execution pipeline includes a second decode unit, and a second execution control unit coupled to the second decode unit. The second execution control unit is configured to control execution of only a subset of the instructions executable via the first execution control unit.

In another embodiment, a method includes fetching an instruction to be executed by a processor. Whether the instruction is executable by a first execution control unit configured to execute only a subset of all instructions executable by the processor is determined. The instruction is directed to a second execution control unit configured to execute all instructions executable by the processor based on the first execution control unit not being configured to execute the instruction.

In a further embodiment, an instruction execution device includes a first execution pipeline and a second execution pipeline. The first execution pipeline includes a first execution control unit and a first decode unit. The first execution control unit is configured to control execution of all instructions executable by the device, and to apply all operand addressing modes supported by the device to access operands. The first decode unit is coupled to the first execution control unit, and is configured to decode all instructions executable by the device. The second execution pipeline includes a second execution control unit and a second decode unit. The second execution control unit is configured to control execution of only a subset of the instructions executable via the first execution control unit, and to apply only register and immediate addressing modes to access operands. The second decode unit is coupled to the second execution pipeline, and is configured to decode only the subset of the instructions.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of additional factors. The term "subset," as used herein, means a "proper subset" that includes fewer than all the elements of a set from which the subset is derived.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Superscalar processors include multiple instruction pipelines operating in parallel in order to provide execution of more than one instruction per cycle. In a superscalar processor, the fetch unit can provide more than one instruction per cycle, multiple instruction decoders determine which instructions can be executed in parallel, and multiple execution pipelines operate in parallel using redundant execution units. However, a superscalar processor generally has a much higher gate count and energy consumption than a single-scalar processor, and in real-world applications the performance increase provided by a superscalar processor may be much less than the full capacity of the execution pipelines. Consequently, the energy consumed per task by a superscalar processor can be significantly higher than the energy consumed by a single-scalar processor executing the same tasks. Increased per task energy consumption is one reason that superscalar processors are rarely applied in embedded systems that are directed to low energy consumption applications, such as applications in which long battery life is important.

Embodiments of the present disclosure include multiple execution pipelines arranged to increase the rate of instruction execution relative to single-scalar processors, and to reduce energy consumption in comparison to conventional superscalar processors. While conventional superscalar processors include multiple instruction decoders, each capable of decoding the full instruction set of the superscalar processor, embodiments disclosed herein include a single decoder capable of decoding the full instruction set, and one or more additional decoders capable of decoding only a small subset of the full instruction set. Similarly, embodiments of the present disclosure include a single execution pipeline capable of executing the full instruction set, and one or more additional execution pipelines capable of executing only the small subset of the full instruction set. The small subset of instructions executable by the additional execution pipeline(s) includes instructions most frequently executed in practical applications.

Figure 1:
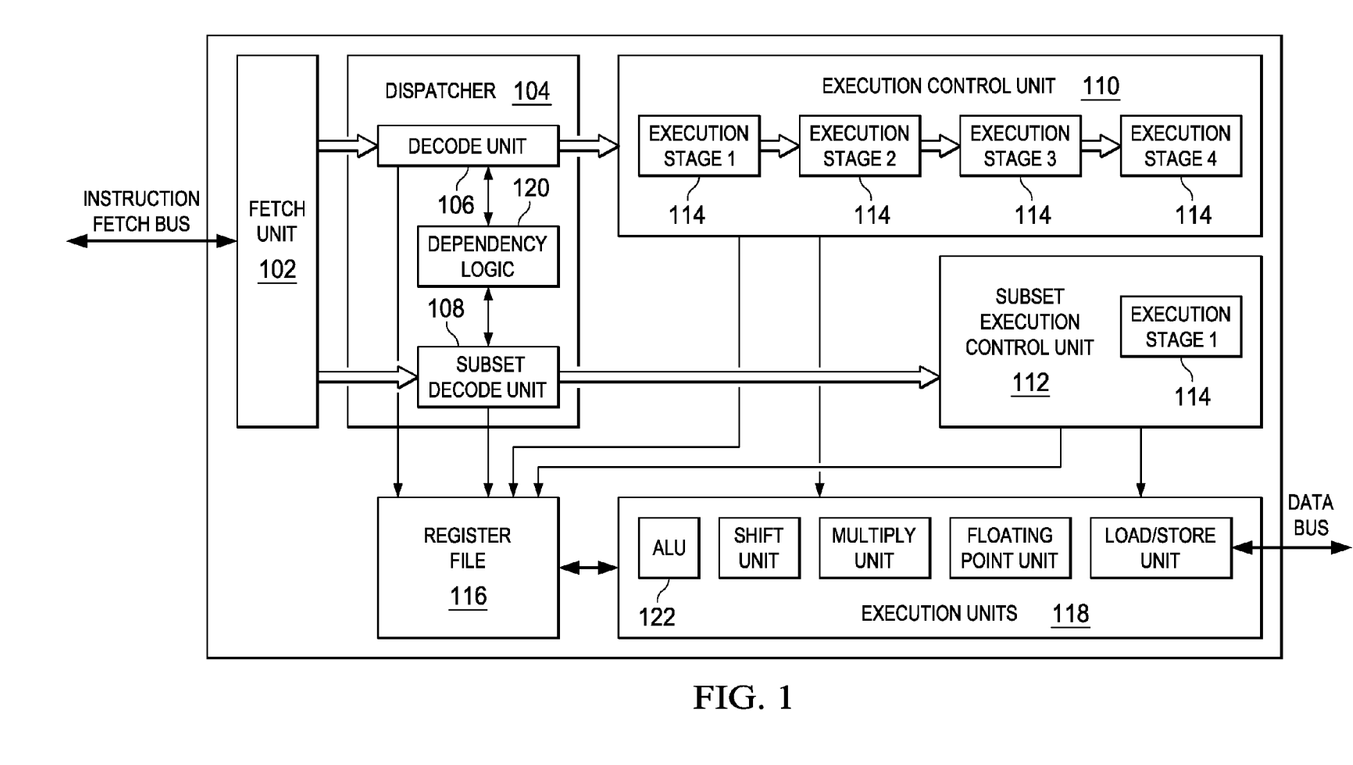
FIG. 1 shows a block diagram of a processor in accordance with various embodiments.

FIG. 1 shows a block diagram of a processor 100 in accordance with various embodiments. The processor 100 includes a fetch unit 102, a dispatcher 104, a full execution control unit 110, a subset execution control unit 112, a register file 116, and execution units 118. The processor 100 may include various other components and subsystems that have been omitted from FIG. 1 in the interest of clarity. For example, embodiments of the processor 100 may include instruction and/or data caches, memory, communication devices, interrupt controllers, timers, clock circuitry, direct memory access controllers, and various other components and peripherals.

The fetch unit 102 retrieves instructions to be executed by the processor 110 from a storage device, such as a random access memory. The fetch unit 102 may include program counters that specify the location of instructions being retrieved, pre-fetching logic that retrieves and stores instructions for later execution, etc.

The dispatcher 104 assigns each instruction provided by the fetch unit 102 for execution to one of the multiple execution pipelines of the processor 100, where each execution pipeline includes a decode unit and an execution control unit. In the embodiment of FIG. 1, the processor 100 includes two execution pipelines. Other embodiments of the processor 100 may include more than two execution pipelines. The dispatcher 104 includes full decode unit 106 and subset decode unit 108. The decode units 106, 108 examine the instructions received from the fetch unit 104, and translate each instruction into controls suitable for operating the associated execution control units, processor registers, and other components of the processor 100 to perform operations that effectuate execution of the instructions.

The full decode unit 106 is capable of decoding all instructions (i.e., the full and complete instruction set) executable by the processor 100. The subset decode unit 108 is capable of decoding only a small subset of the instructions executable by the processor 100 (i.e., a small subset of the instructions decodable by the full decoder 106). For example, the subset decode unit 108 may be capable of decoding only the most frequently executed instructions or a selected ones of the most frequently executed instruction. Some embodiments of the subset decode unit 108 may be capable of decoding only instructions that apply relatively simple operand addressing (e.g., instructions applying only register or immediate addressing modes).

The dispatcher 104 includes dependency logic 120 that identifies dependencies (e.g., data dependencies) between instructions being executed, and causes the decode units 106, 108 to resolve dependencies identified by the dependency logic 120. For example, on identification of a dependency by the dependency logic 120, the decode unit decoding the instruction subject to the dependency may delay transfer of the instruction to the execution control unit until the dependency has been resolved.

Each decode unit 106, 108 passes decoded instructions to the corresponding execution control unit. Full decode unit 106 passes instructions to full execution control unit 110 for execution, and subset decode unit 108 passes instructions to subset execution control unit 112 for execution. The full execution control unit 110 is a capable of executing all instructions (i.e., the full and complete instruction set) executable by the processor 100. The subset execution control unit 112 is capable of executing only a small subset of the instructions executable by the processor 100 (i.e., a small subset of the instructions decodable by the full decoder 106). For example, the subset execution control unit 112 may be capable of executing only selected instructions that are most frequently executed by the processor 100. Some embodiments of the subset execution control unit 112 may be capable of executing only instructions that apply relatively simple operand addressing (e.g., instructions applying only register or immediate addressing modes).

The full execution control unit 110 may include multiple execution stages 114 to provide a high instruction execution rate over the entire instruction set. The subset execution control unit 112 may include fewer execution stages 114 than the full execution control unit 110. For example, only a single execution stage 114 may be provided via the subset execution control unit 112 to execute the small subset of instructions executable by the subset execution control unit 112.

In some embodiments of the processor 100, the full decode unit 106 and full execution control unit 110 may decode and execute instructions of a complex instruction set (i.e., CISC instructions) and instructions of a reduced instruction set (i.e., RISC instructions) executable by the processor 100, and the subset decode unit 108 and subset execution control unit 112 may decode and execute only the RISC instructions. In some embodiments of the processor 100, the subset decode unit 108 and subset execution control unit 112 may decode and execute only a subset of the RISC instructions executable by the processor 100. For example, the subset decode unit 108 and subset execution control unit 112 may decode and execute only RISC instructions that apply only the ALU 122 and/or that manipulate only operands stored in the register file 116 or provided in the instruction itself (i.e., apply only register or immediate addressing modes).

The execution units 118 include various function units (shift unit, multiply unit, etc.) applied by the execution control units 110, 112 to manipulate data and perform other operations needed for instruction execution. The full execution control unit 110 may have access to and apply any and all of the function units provided by the execution units 118. The subset execution control unit 112 may have access to and apply fewer function units of the execution units 118 than the full execution control unit 110. For example, the subset execution control unit 112 may access and apply only the arithmetic logic unit (ALU) 122 in some embodiments. Some embodiments of the execution units 118 may include more than one instance of a function unit to facilitate parallel instruction execution in the execution pipelines. For example, the execution units 118 may include more than one ALU 122 to allow parallel access to ALU 122 functionality by the full execution control unit 110 and the subset execution control unit 112.

The register file 116 includes registers that store operands for access and manipulation by the dispatcher 104, the full execution control unit 110, the subset execution control unit 112, and the execution units 118. The number and/or width of the registers included in the register file 116 may be different in different embodiments of the processor 100.

In practice, the performance gained by inclusion of the subset decoder 108 and the subset execution control unit 112 in the processor 100 can approach that provided by conventional superscalar implementations, by providing parallel execution of the most frequently encountered instructions, while substantially reducing energy consumption relative to conventional superscalar implementations. The circuitry added to the processor 100 to implement the subset decoder 108 and the subset execution control unit 112 is relatively small in comparison to the circuitry of the full decoder 106 and the full execution control unit 110. As a result, the energy consumed by the subset decoder 108 and the subset execution control unit 112 is relatively low in comparison to that consumed by the full decoder 106 and the full execution control unit 110.

Figure 2:
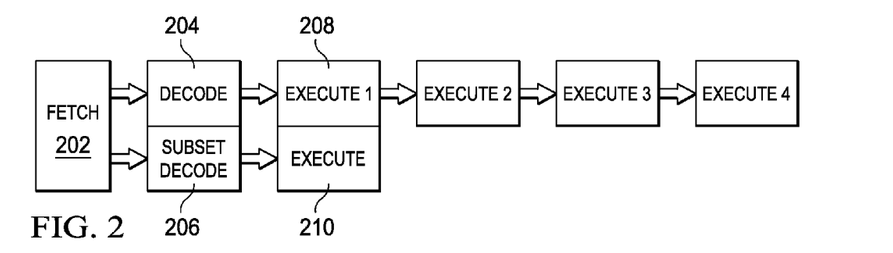
FIGS. 2 and 3 show diagrams of instruction execution in pipelines of a processor in accordance with various embodiments.
Figure 3:
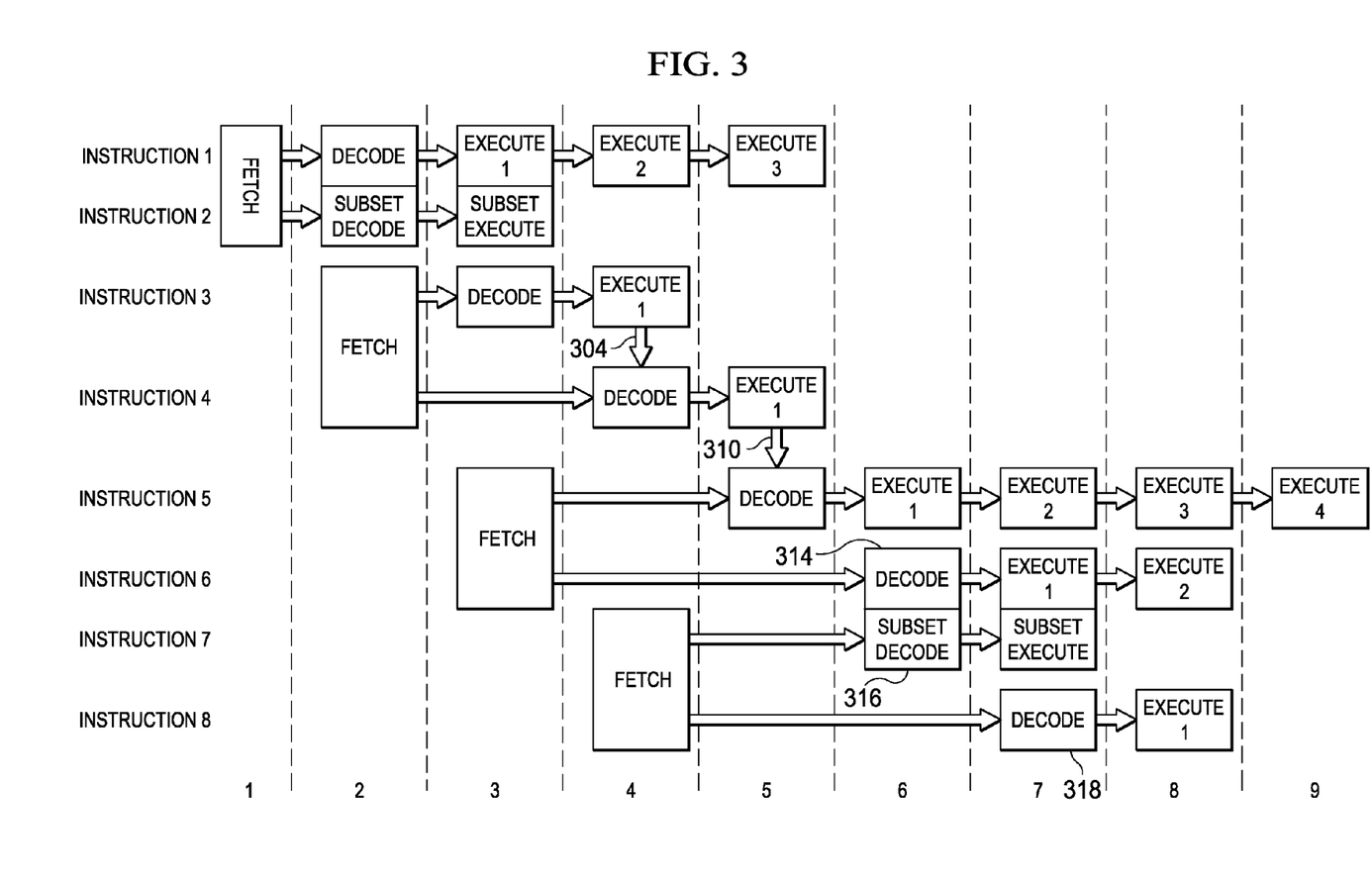

FIGS. 2 and 3 show diagrams of instruction execution in the processor 100. In FIG. 2, the fetch unit 102 provides, in fetch cycle 202, instructions to be decoded and executed. The full decode unit 106 decodes a first instruction in decode cycle 204, and the subset decode unit 108 decodes a second instruction in decode cycle 206, which is in parallel with decode cycle 204. Execution of the decoded instructions proceeds in parallel with full execution control unit 110 executing the first instruction in execution cycle 208. The second instruction is executed in parallel by the subset execution control unit 112, which executes the second instruction in execution cycle 210. Execution of the second instruction completes in a single cycle, while execution of the first instruction requires multiple cycles.

FIG. 3 shows a multi-instruction execution sequence in the processor 100. In the execution sequence of FIG. 3, performance of the processor 100 is very similar to that achievable by a conventional superscalar architecture because the execution timing is constrained by data dependencies. Executing selected instructions via the limited decoding and execution capabilities of the subset decode unit 108 and the subset execution control unit 112 can reduce the energy consumed by execution of the instruction sequence with little or no reduction in performance.

Instructions 1 and 2 are executed in parallel as explained with regard to FIG. 2. Instructions 3 and 4 are fetched in cycle 2, but a dependency 304 between the instructions causes the dispatcher 104 to delay execution of instruction 4 for one cycle. Accordingly, instruction 4 is decoded in cycle 4 in parallel with execution of instruction 3. Execution of instructions 3 and 4 may be performed in either of the pipelines of processor 100 that provide suitable decoding and execution functionality. In some embodiments, execution by the subset decode unit 108 and subset execution control unit 112 may be selected to reduce energy consumption.

Instructions 5 and 6 are fetched in cycle 3. Decoding of instruction 5 is delayed until cycle 5 due to dependency 310. Instruction 5 is a complex instruction that requires multiple execution cycles in the full execution control unit 110 to complete. Instruction 6 is also a complex instruction that must be executed in the full execution pipeline. Therefore, decoding of instruction 6 is delayed until cycle 6. In the instruction sequence of FIG. 3, instruction 6 is the only instruction for which decoding and subsequent execution is delayed by the limited decoding and execution capabilities of the subset decode unit 108 and the subset execution control unit 112 when compared to execution by a conventional superscalar implementation.

Instructions 7 and 8 are fetched in cycle 4 and execution is delayed. Instruction 7 is decoded by the subset decode unit in cycle 6, and executed in the subset execution control unit in cycle 7. Instruction 8 is decoded by the subset decode unit 108 in cycle 7, and executed in the subset execution control unit 112 in cycle 8. In various embodiments, instruction 8 may be executed in either pipeline of the processor 100.

Figure 4:
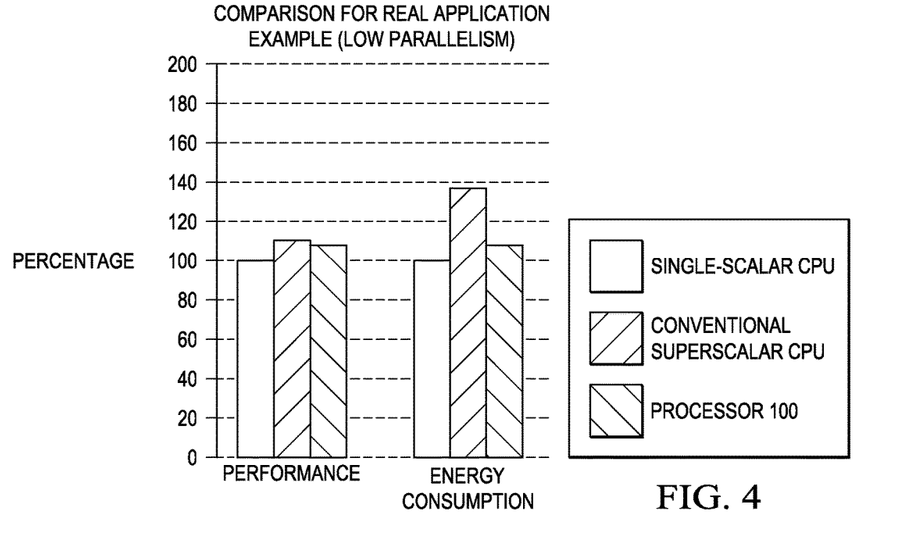
FIGS. 4 and 5 show performance of conventional processors relative to a multi-pipeline processor in accordance with various embodiments.
Figure 5:
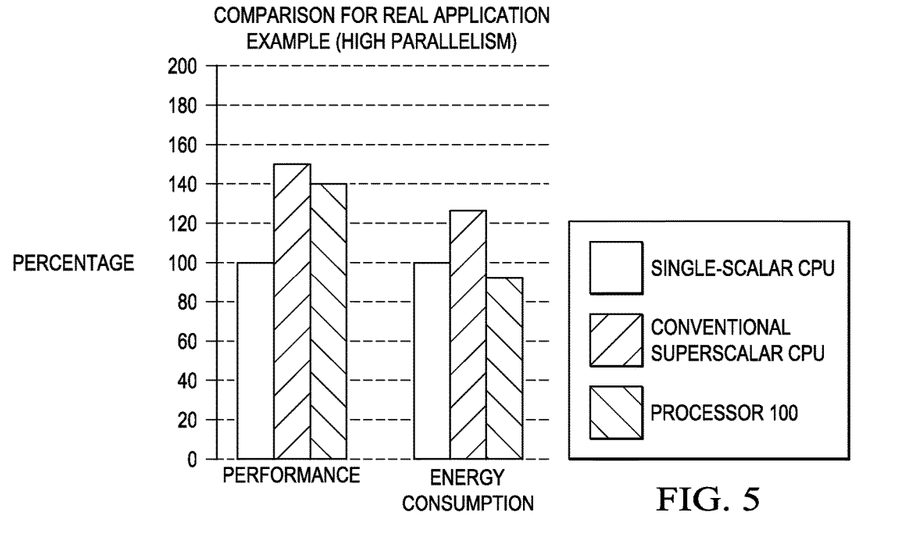

FIGS. 4 and 5 show performance of conventional processors relative to the processor 100. In FIG. 4, execution performance for a practical application exhibiting low instruction parallelism (e.g. due to a substantial number of instruction dependencies) is shown. Because of the low instruction parallelism, performance of the processor 100 and the conventional superscalar processor are only slightly better than that of the single-scalar processor. The energy consumption of the processor 100 is slightly higher than that of the single-scalar processor, and the energy consumption of the conventional superscalar processor is substantially higher that the single-scalar processor and the processor 100.

FIG. 5 shows performance for a practical application exhibiting high instruction parallelism. Performance of both the conventional superscalar processor and the processor 100 is significantly higher than that of the single-scalar processor, with the conventional superscalar processor performing slightly better than the processor 100. However, the energy consumption of the conventional superscalar processor is substantially higher than single-scalar processor, and the processor 100 consumes less energy that the single-scalar processor. Thus, as shown in FIGS. 4 and 5, the processor 100 can provide a substantial performance increase over a single-scalar processor while consuming much less energy than a conventional superscalar processor.

Figure 6:
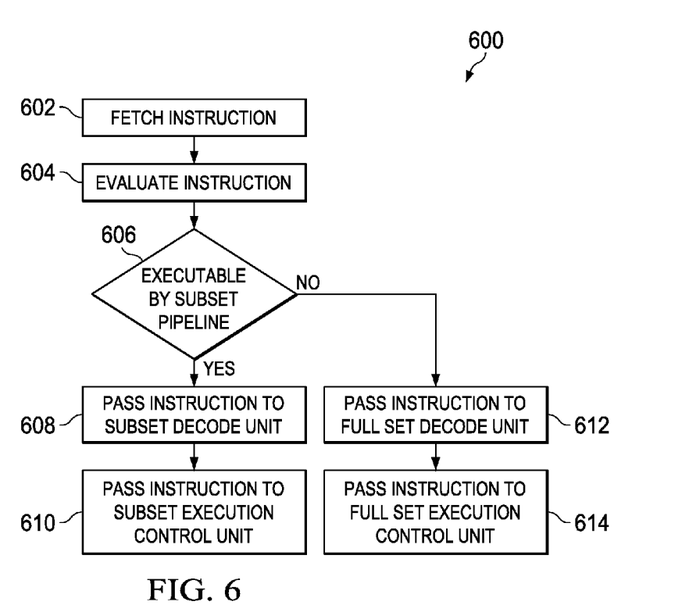
FIG. 6 shows a flow diagram for a method for executing instructions in a multi-pipeline device in accordance with various embodiments.

FIG. 6 shows a flow diagram for a method 600 for executing instructions in accordance with various embodiments. Though depicted sequentially as a matter of convenience, at least some of the actions shown can be performed in a different order and/or performed in parallel. Additionally, some embodiments may perform only some of the actions shown.

In block 602, the fetch unit 102 fetches instructions from memory for execution and provides the fetched instructions to the dispatcher 104.

In block 604, the dispatcher 104 evaluates an instruction received from the fetch unit 102, and determines whether the instruction can be executed by the subset execution pipeline (e.g., the subset decoder 108 and subset execution control unit 112). As explained above, the subset execution pipeline executes only a small subset of the full instruction set executable by the processor 100. For example, the subset execution pipeline may execute only RISC instructions or a subset of the RISC instructions executable by the processor 100, while the full instruction pipeline can execute any and all instructions (including CISC instructions) executable by the processor 100.

If, in block 606, the subset execution pipeline is deemed capable of executing the instruction evaluated by the dispatcher 104, then in block 608, the dispatcher 104 routes the instruction to the subset decoder 108. The subset decoder 108 decodes the instruction.

In block 610, the subset decoder 108 passes the decoded instruction to the subset execution control unit 112, and the subset execution control unit 112 applies the execution units 118 to execute the instruction. In some embodiments, the subset execution control unit 112 executes the instruction in a single cycle.

If, in block 606, the subset execution pipeline is deemed incapable of executing the instruction evaluated by the dispatcher 104, then in block 612, the dispatcher 104 routes the instruction to the full decoder 106. The full decoder 106 decodes the instruction.

In block 614, the full decoder 106 passes the decoded instruction to the full execution control unit 110, and the full execution control unit 110 applies the execution units 118 to execute the instruction. In some embodiments, the full execution control unit 110 executes the instruction in a multiple cycles.

While embodiments of the present disclosure have been described with reference to the processor 100, embodiments of the multi-pipeline arrangement disclosed herein may be applied to improve performance while minimizing energy consumption in a wide variety of instruction execution devices.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processor, comprising:
   a plurality of execution units;
   a first execution pipeline comprising:
      a first decode unit configured to decode all instructions executable by the processor; and
      a first execution control unit coupled to the first decode unit and having a plurality of execution stages, the first execution control unit being configured to control execution of all instructions executable by the processor using:
         any of one or more of the plurality of execution units; and
         one or more of the plurality of execution stages; and
   a second execution pipeline comprising:
      a second decode unit configured to decode only a subset of the instructions executable via the first execution control unit; and
      a second execution control unit coupled to the second decode unit and having at least one execution stage, the second execution control unit being configured to control execution of only the subset of the instructions that the second decode unit is configured to decode;
   wherein the first and second execution pipelines are separate from one another such that all execution stages of the first execution control unit are exclusive of all execution stages of the second execution control unit.

2. The processor of claim 1, wherein the second decode unit is configured to decode only a subset of the instructions decodable by the first decode unit.

3. The processor of claim 1, wherein the first execution pipeline is configured to control execution of instructions of a complex instruction set decoded by the first decode unit and executable by the processor and instructions of a reduced instruction set decoded by the first decode unit and executable by the processor; and wherein the second execution pipeline is configured to control execution of instructions of the reduced instruction set.

4. The processor of claim 1, wherein the first execution pipeline is configured to control execution of instructions of a reduced instruction set executable by the processor and wherein the second execution pipeline is configured to control execution of fewer than all instructions of the reduced instruction set.

5. The processor of claim 1, wherein the first execution pipeline is configured to apply all addressing modes supported by the processor, and the second execution pipeline is configured to apply only register and immediate addressing modes supported by the processor.

6. The processor of claim 1, wherein the subset of the instructions executable via the second execution control unit comprises instructions statistically recognized as most frequently executed by the processor.

7. The processor of claim 1, wherein the plurality of execution units are configured to execute operations as part of instruction execution, and are shareably controlled by the first execution pipeline and the second execution pipeline.

8. The processor of claim 1, further comprising:
   a fetch unit configured to retrieve instructions to be executed by the processor; and
   an instruction dispatch unit configured to, for each instruction retrieved by the fetch unit, select one of the first decode unit and the second decode unit to decode the instruction, the selection based, at least in part, on whether the second decode unit is configured to decode the instruction.

9. The processor of claim 1, wherein the at least one execution stage of the second execution control unit is a single execution stage and is the only execution stage of the second execution control unit.

10. The processor of claim 1, wherein the first and second decode units are separate from each other, wherein the first execution control unit is arranged to receive decoded instructions only from the first decode unit and the second execution control unit is arranged to received decoded instructions only from the second decode unit.

11. A method, comprising:
   fetching an instruction to be executed by a processor;
   determining whether the instruction is executable by a first execution control unit of a first execution pipeline, the first execution control unit having at least one execution stage and being configured to execute only a subset of all instructions executable by the processor that are executable using only a same selected one of a plurality of execution units of the processor; and
   directing the instruction to a second execution control unit of a second execution pipeline that is separate from the first execution pipeline, the second execution control unit having a plurality of execution stages and being configured to execute all instructions executable by the processor using one or more of the plurality of execution units based on the first execution control unit not being configured to execute the instruction, wherein the at least one execution stage of the first execution control unit is separate from the plurality of execution stages of the second execution control unit.

12. The method of claim 11, wherein the directing comprises providing the instruction to a decode unit, configured to decode the instruction, that is coupled to the second execution control unit.

13. The method of claim 11, further comprising directing the instruction to the first execution control unit based on the first execution control unit being configured to execute the instruction.

14. The method of claim 11, wherein the second execution control unit is configured to execute all instructions executable by the processor; and the first execution control unit is configured to execute only a subset of the instructions executable by the second execution control unit.

15. The method of claim 11, wherein the directing comprises directing instructions of a complex instruction set executable by the processor to the second execution control unit, wherein the second execution control unit is configured to control execution of instructions of the complex instruction set executable by the processor; and directing instructions of a reduced instruction set executable by the processor to the first execution control unit; wherein the first execution control unit is configured to control execution of instructions of the reduced instruction set.

16. The method of claim 11, wherein the directing comprises directing any instruction of a subset of instructions of a reduced instruction set executable by the processor to the first execution control unit, wherein the first execution control unit is configured to control execution each instruction of the subset of instructions of the reduced instruction set executable by the processor; and directing any instruction of the reduced instruction set to the second execution control unit, wherein the second execution control unit is configured to control execution of all instructions of the reduced instruction set.

17. The method of claim 11, further comprising:
accessing operands via any addressing mode supported by the processor via the second execution control unit; and
accessing operands via only register direct addressing or immediate addressing via the first execution control unit.

18. The method of claim 11, wherein the at least one execution stage of the first execution control unit is a single execution stage and is the only execution stage of the first execution control unit.

* * * * *